May 22, 1945.  R. A. GRANHOLM  2,376,689
ANCHORAGE SCREW BUSHING
Filed Dec. 29, 1944

INVENTOR.
R. A. Granholm
BY

Patented May 22, 1945

2,376,689

UNITED STATES PATENT OFFICE 2,376,689

ANCHORAGE SCREW BUSHING

Robert A. Granholm, Lyndhurst, Ohio

Application December 29, 1944, Serial No. 570,373

2 Claims. (Cl. 85—2.4)

The object of my invention has been to produce a novel form of expansible anchor bolt bushing.

The bushing of my invention is intended to be used in connection with screw bolts for effectively anchoring the bolts in recesses formed in stone work, brick work, or masonry, or the like, the bushing being made of suitable soft metal to facilitate the cutting by the bolt of the threads in the bushing and to utilize such cutting effect by the bolt as a means for expanding sections of the bushing against the walls of the recess in which it may be disposed. The bushing of my invention is especially constructed to provide mating sections of substantially identical form and readily interchangeable and emplaceable against each other so as to fit snugly together when disposed in the opening in the works in which the screw bolt is to be anchored, the sections expanding under the action of the entering of the screw bolt therebetween so as to frictionally engage the walls of the opening in order that the proper anchorage for the screw bolt may be obtained.

A full understanding of my invention will be had upon reference to the accompanying drawing, in which.

Figure 2:
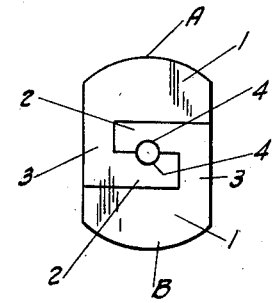
Figure 2 is an end view of the bushing of my invention showing the bore sections as they are provided in the mating sections of the bushing.
Figure 3:
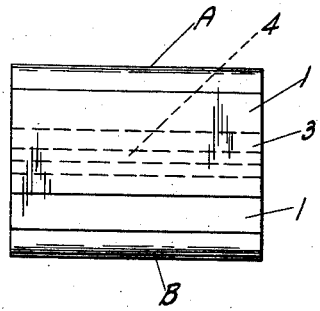
Figure 3 is a side elevation of the sectional bushing alone.
Figure 4:
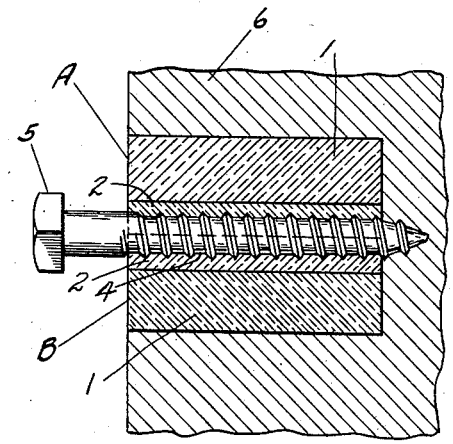
Figure 4 is a full section through a wall and also the bushing, with the screw bolt anchored in place.

Referring to the drawing and describing the preferred embodiment of my invention as depicted therein, it will be observed that the bushing seen in Figures 2 and 3 particularly is composed of mating and interlocking sections designated generally at A and B. Each of the sections A and B is of identical construction and may be described as composed of an L-shaped body, the longer leg of the L portion designated 1 and the shorter leg 2. The two legs are connected together by the portion 3.

The sections A and B are adapted to be fitted together in interlocked relation by sliding what I call the leg portions 1 and 2 longitudinally of each other and toward each other, so that the shorter leg portions 2 of each member A and B will be interlocked between the shorter leg portion of the other member and its longer leg portion.

The members 1 and 2 of the bushing section are intended to fit snugly in fairly close engagement with the corresponding portions of the cooperating section.

On the inner face of each short leg portion 2 of each bushing section there is provided a semicircular recess designated 4, the recesses being so formed that they will be opposite each other when the sections of the bushing are assembled together. The bore portions 4 of the two mating sections of the bushing provide a bore to receive the threaded portion of the screw bolt, but this bore is of a smaller diameter than that of the screw bolt itself, the latter being designated 5 in Figure 1 and comprising the customary head and shank portion, the latter carrying the screw thread.

Figure 1:
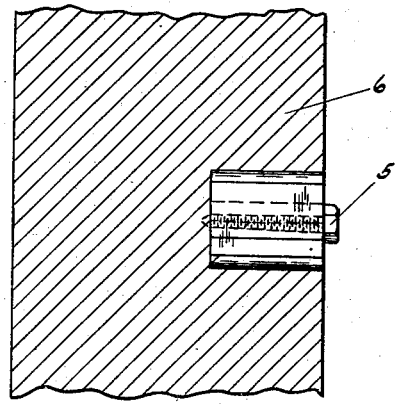
Figure 1 is a vertical sectional view of a wall or similar structure recessed to receive the bushing by which the anchorage bolt shown in operative engagement therewith is to be mounted.

Now in the operation or use of my invention, it will be noted that it is contemplated to first recess the portion of the wall or other structure designated 6 in Figure 1, at which the bolt anchorage is to be effective. When a recess has been made of suitable size to fairly snugly receive the bushing comprising the mated members A and B, the assembled sections of the bushing are emplaced in said recess as seen in Figure 1, so that the bore portions 4 together provide the screw bolt into which the anchorage bolt is to be introduced. When the bushing parts have been positioned in the manner described, the threaded shank of the bolt 5 is introduced into the bore comprising the portions 4 and screwed firmly thereinto the required distance for anchoring the bolt for whatever purpose it is to be used.

In the operation of screwing the bolt 5 into the bore provided by the portions 4 of the bushings, the members A and B of the bushing being made of soft substance such as lead, or soft iron may be used, the effect of the screwing action of the bolt is to move the upper surface of the section A upwardly as seen in Figure 2, and the lower surface of the section B downwardly, in said figure. Moreover, the rotary motion imparted to the screw bolt by the turning action above described has a tendency to move the leg portions 2 of the bushing unit in opposite directions, or laterally as the said parts are illustrated in Figure 2.

Under the foregoing conditions it will be apparent that the bushing on all sides is in the above manner caused to frictionally bind in the recess or opening in the wall or other structure in which it is disposed, and the action of the threads of the screw bolt is to cut their way into the metal of the bushing and virtually form a screw thread in the latter at the bore portions 4.

It will be seen from the foregoing also that there is provided a very simple and compact form of expansible bushing and one which is very efficient in its operation to obtain the required advantages for anchoring screw bolts in the manner set forth.

Having thus described my invention, what I claim as new and desire to secure by Letters Patent of the United States, is—

1. A screw bolt anchorage unit including a bushing comprising soft metal mating sections, each of said sections being generally of L-form including spaced legs, said sections being assembled with one of the legs of each section received between the two legs of the other section, and adjacent surfaces of inner contacting legs being provided with opposing bore portions to receive a screw bolt and a screw bolt of larger diameter than said bore portions received by the latter and directly engaging the bore portions of the sections.

2. An anchorage bushing unit for screw bolts comprising soft metal mating sections, each composed of a relatively long leg portion, a relatively short leg portion spaced from the long leg portion, and a connecting portion between the outer ends of the long and short leg portions, said sections being assembled together so that the shorter leg portion of one section is received between the longer and shorter leg portions of the other section with the inner faces of the shorter leg portions being in substantial contact with each other and formed intermediate therein with a bore portion so that the bore portion of one shorter leg section matches or is opposite the bore portion of the other leg section, and a screw bolt of larger diameter than said bore portions received by the latter and directly engaging the bore portions of the sections.

ROBERT A. GRANHOLM.